United States Patent [19]

Langner

[11] Patent Number: 5,259,700

[45] Date of Patent: Nov. 9, 1993

[54] PIPE LOOP EXPANSION/BREAKAWAY PROTECTION DEVICE

[75] Inventor: Carl G. Langner, Spring, Tex.

[73] Assignee: Shell Oil Company, Houston, Tex.

[21] Appl. No.: 226,120

[22] Filed: Jul. 29, 1988

[51] Int. Cl.⁵ .............................................. F16L 1/16
[52] U.S. Cl. ................................... 405/211; 166/346; 405/158
[58] Field of Search ............... 405/154, 158, 195, 202, 405/157, 211; 138/32, 103; 166/344, 346, 347

[56] References Cited

U.S. PATENT DOCUMENTS

| | | | |
|---|---|---|---|
| 3,096,104 | 7/1963 | Browning | 285/226 |
| 3,459,377 | 8/1969 | Van Der Hulse | 239/394 |
| 3,718,183 | 2/1973 | Scott | 166/346 X |
| 3,878,868 | 4/1975 | Wheeler | 138/32 |
| 3,961,772 | 11/1974 | Sweeney | 254/173 R |
| 4,067,202 | 1/1978 | Reed | 166/346 X |
| 4,279,544 | 7/1981 | Brun et al. | 405/202 |

Primary Examiner—David H. Corbin

[57] ABSTRACT

The present invention pertains to a pipeline having a deliberate weak link to relieve a large tension load, said weak link being a pipe loop in said pipeline of sufficient weakness to fail prior to reaching said large tension load.

8 Claims, 2 Drawing Sheets

PIPE LOOP EXPANSION/BREAKAWAY PROTECTION DEVICE

BACKGROUND OF THE INVENTION

It is desirable to protect offshore platforms and pipeline lateral tie-ins from very large pipeline tension loads that can result from soil movements such as mud slides or anchor hooking by ships, drilling vessels, construction vessels, etc. Pipelines are very strong inasmuch as they are made to withstand high pressure and years of exposure to corrosive elements, etc., and when a high tension is applied to the pipeline, the force is transmitted directly to the offshore platform, and the like, to which the pipeline is attached. Accordingly, the present invention provides a unique and economical solution to overcome this problem of the art.

Applicant is not aware of any prior art which, in his judgment is one skilled in the pipeline art, would anticipate or render obvious the novel protective device of the present invention; however, for the purposes of fully developing the background of the invention, the following art is set forth: U.S. Pat. Nos. 3,961,772; 3,878,868; 3,459,377; 3,096,104.

SUMMARY OF THE INVENTION

The primary purpose of the present invention is to provide a method and apparatus for protecting offshore platforms, pipeline lateral tie-ins and the like from large pipeline tension loads. Accordingly, the present invention provides a method for protecting an offshore structure from a large tension load in a pipeline connecting to said structure, said method comprising, providing a pipe loop in said pipeline of sufficient weakness in tension to fail prior to reaching said large tension load. In accomplishing this method, the invention also provides a pipeline having a deliberate weak link to relieve a large tenssion load, said weak link comprising, a pipe loop in said pipeline of sufficient weakness to fail prior to reaching said large tension load. The pipe loop may be either a 360-degree loop or a loop of less than 360 degrees, preferably composed of straight and circular pipe segments welded together. When less than a 360-degree loop, preferred designs are U-shaped or Ω-shaped, the latter composed of three adjacent circular pipe segments.

Other purposes, distinctions over the art, advantages and features of the invention will be apparent to one skilled in the art upon review of the following.

BRIEF DESCRIPTION OF THE DRAWINGS

FIG. 6 shows a long radius 360-degree breakaway protection loop for a riser or platform tie-in.

DESCRIPTION OF PREFERRED EMBODIMENTS

The present invention provides a method and apparatus for protecting offshore platforms and pipeline lateral tie-ins from the very large pipeline tension loads that can result from soil movements such as mud slides, or anchor hooking by ships, drilling vessels, construction vessels, etc. The invention basically is a simple pipe loop, which may be formed for example by welding straight and circular pipe segments together as shown in the figures of applicant's drawings.

Such pipe loops can be designed to completely absorb thermal and pressure expansion loads without damage. Under increasing tension loads, such pipe loops expand elastically, then yield and buckle, and finally break at a relatively small force, typically 5-20% of the breaking strength of the pipe itself, as indicated by the attached theoretical and experimental data. Optionally, a groove of from about 10-20% of the wall thickness of the pipe may be cut into the pipe preferably at the top of the loop to further reduce and to make more predictable the breakaway action of the device.

During the installation of a pipeline containing such a pipe loop onto the sea floor, the pipe loop is preferably clamped together temporarily, e.g. at the bottom of the loop. After installation, this clamp is removed, for example by a diver or ROV, thus activating the loop as a deliberate "weak link" in the pipeline.

Advantages of the 360-degree pipe loop as an expansion/breakaway include: (1) high reliability, since the loop preferably comprises all welded steel pipe, preferably having no mechanical parts or seals; (2) greater safety compared with commercial breakaway couplings, since the pipe loop will expand approximately 2.5 times the loop diameter before separation failure; thus, ample warning is given to shut down the pipeline by the early buckling of the pipe loop, well in advance of the separation failure condition, and by the consequent pressure rise in the upstream portion of the pipeline.

Having thus generally described the apparatus and method of the present invention, as well as its numerous advantages over the art, the following is a more detailed description thereof, given in accordance with specific reference to the drawings.

Figure 1:
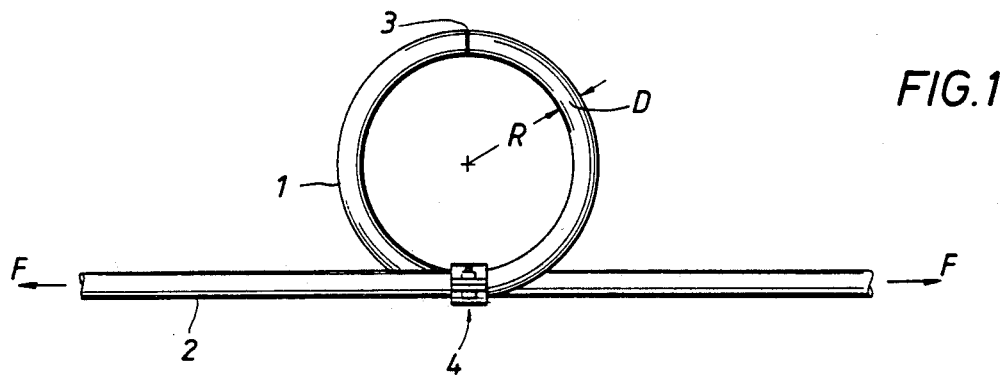
FIG. 1 shows a 360-degree pipe loop with a temporary pipe clamp.

FIG. 1 discloses a typical 360-degree pipe loop expansion/breakaway protection device. The loop 1 which forms a part of pipeline 2 preferably at its top portion 3 may be grooved about 10-20% of wall thickness to reduce and insure a more predictable breakaway load. A temporary pipe clamp 4 is placed at the bottom of the pipe loop (contact point) to resist pipeline installation loads. It is preferably removed after installation by a diver or ROV, thus activating the pipe loop as a weak link in the pipeline.

Figure 2:
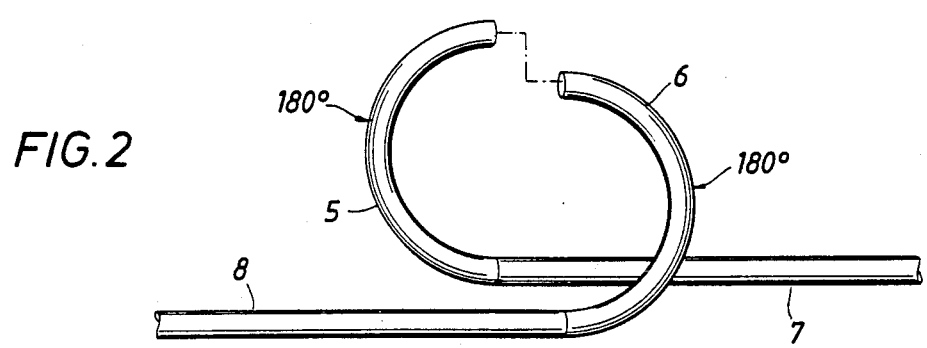
FIGS. 2 and 3 show three-weld and four-weld fabrications of a 360-degree pipe loop.

As shown in FIG. 2 the pipe loop to be fabricated may be made from straight and circular shop-bent sections of pipe as indicated in the figure. Thus, there is shown a pipe consisting of two 180-degree portions 5 and 6 connected to straight portions, 7 and 8.

Figure 3:
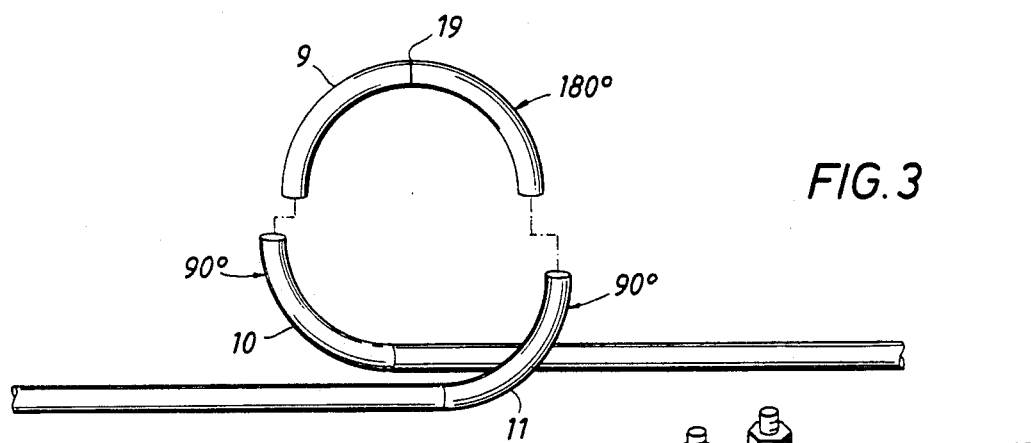

In FIG. 2 there is shown a three-weld fabrication, and in FIG. 3 there is shown a four-weld fabrication comprising circular portion 9 which is a 180-degree portion and 10 and 11 which are 90-degree portions. The three-weld fabrication provides minimal cost pipe loop. The four-weld fabrication may provide greater strength since the failure point 19 does not include a weld.

Figure 4:
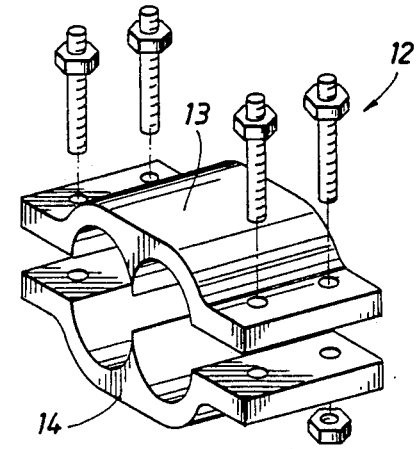
FIG. 4 shows details of a pipe clamp.

In FIG. 4 there is shown details of a pipe clamp which includes bolts 12 which fasten separate halves 13 and 14.

Figure 5:
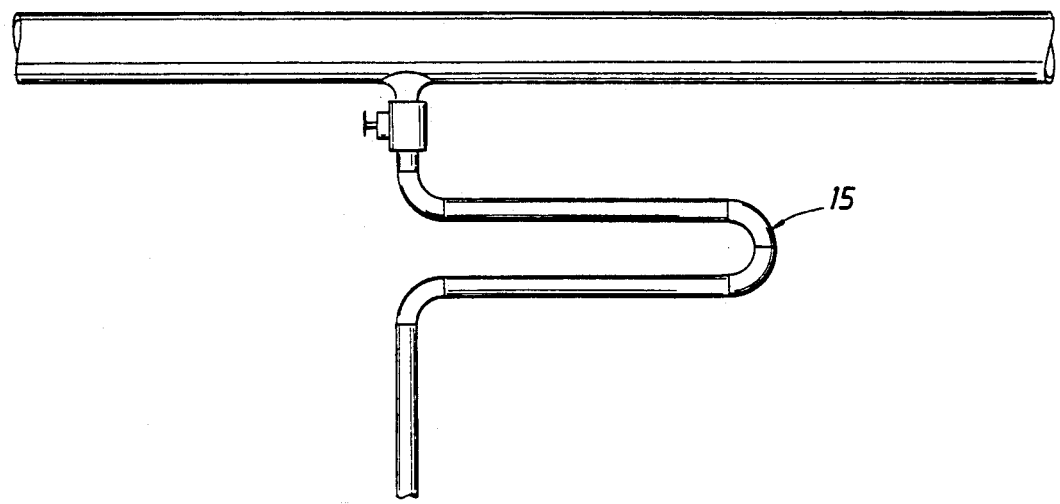
FIG. 5 shows a short radius U-shaped breakaway protection loop which is a lateral tie-in of a small line into a larger existing line.

FIG. 5 depicts a short radius U-shaped protection loop 15 which is a lateral tie-in of a small line into a larger existing line.

Figure 6:
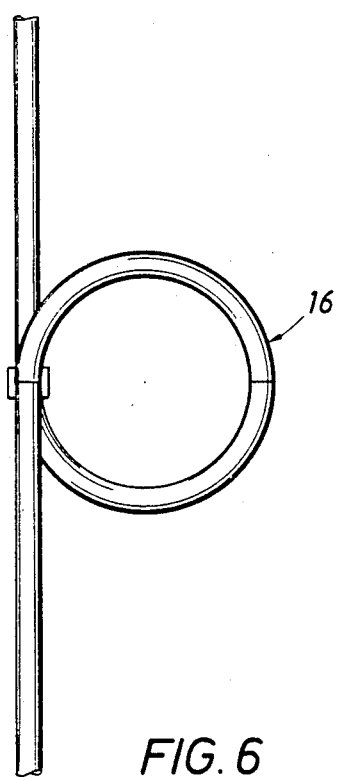

FIG. 6 is directed to a long radius 360-degree breakaway protection loop 16, vertically extending as compared to the horizontally extending loop shown in FIG. 1, which is useful for any riser or platform tie-in where pigging is required.

Figure 7:
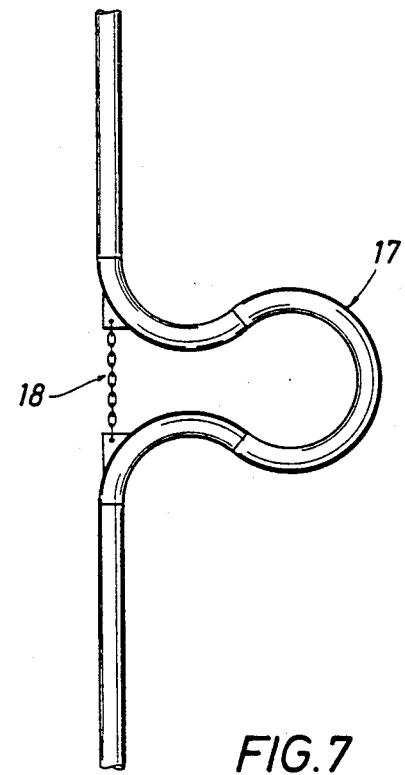
FIG. 7 show an intermediate radius Ω-shaped breakaway protection loop for use with risers or pipeline tie-ins.

FIG. 7 shows an intermediate radius Ω-shaped breakaway protection loop 17 which is also for use in platform risers or at platform tie-ins. A link such as chain 18 protects the loop during installation and must be cut before leaving the installation site.

Small scale tests results and predictions are shown in Table 1 hereinafter:

Predicted full scale forces and elongations are shown in Table 2 below:

TABLE 2

360-DEGREE PIPE LOOP EXPANSION/BREAKAWAY PROTECTION DEVICE PREDICTED FULL SCALE FORCES AND ELONGATIONS

| D (in) | T (in) | M (kp-ft)* | R (ft) | Fy (kp) | Fu (kp) | ey (ft) | eu (ft) | Fu/Tu* |
|---|---|---|---|---|---|---|---|---|
| 8.63 | .500 | 186.2 | 3 | 53 | 155 | 1.5 | 15 | .15 |
| 8.63 | .500 | 186.2 | 4 | 40 | 116 | 2 | 20 | .11 |
| 8.63 | .500 | 186.2 | 6 | 26 | 78 | 3 | 30 | .08 |
| 8.63 | .500 | 186.2 | 8 | 20 | 58 | 4 | 40 | .06 |
| 12.75 | .625 | 508 | 4 | 108 | 218 | 2 | 20 | .17 |
| 12.75 | .625 | 508 | 6 | 72 | 212 | 3 | 30 | .11 |
| 12.75 | .625 | 508 | 8 | 54 | 159 | 4 | 40 | .08 |
| 12.75 | .625 | 508 | 12 | 36 | 106 | 6 | 60 | .06 |
| 16.0 | .750 | 960 | 6 | 136 | 400 | 3 | 30 | .14 |
| 16.0 | .750 | 960 | 8 | 102 | 300 | 4 | 40 | .10 |
| 16.0 | .750 | 960 | 12 | 68 | 200 | 6 | 60 | .07 |
| 16.0 | .750 | 960 | 16 | 51 | 150 | 8 | 80 | .05 |
| 20.0 | .875 | 1750 | 8 | 186 | 547 | 4 | 40 | .13 |
| 20.0 | .875 | 1750 | 12 | 124 | 365 | 6 | 60 | .09 |
| 20.0 | .875 | 1750 | 16 | 93 | 273 | 8 | 80 | .07 |
| 20.0 | .875 | 1750 | 24 | 62 | 182 | 12 | 120 | .04 |

*Assume Pipe Yield Stress Y = 60 ksi

The foregoing description of the invention is merely intended to be explanatory thereof, and various changes in the details of the described methods and apparatus may be made within the scope of the appended claims without departing from the spirit of the invention.

What is claimed is:

1. A method for protecting an offshore structure from a certain tension load in a pipeline connecting to said structure, comprising:
   constructing a pipe loop in said pipeline of relative weakness in tension so as to fail prior to reaching said certain tension load; and
   weakening the pipe loop by forming a groove in the pipe loop.

2. The method of claim 1 including forming the groove to a depth of from about 10 to 20% of the wall thickness of the pipe.

TABLE 1

360-DEGREE PIPE LOOP EXPANSION/BREAKAWAY PROTECTION DEVICE SMALL SCALE TEST RESULTS AND PREDICTIONS

| | | Measured Forces | | Measured Elongations | | Strengths Ratios | | |
|---|---|---|---|---|---|---|---|---|
| D (in) | R (in) | Fy (kp) | Fu (kp) | ey (in) | eu (in) | Fy/Tu | Fu/Tu | Remarks |
| 1.3 | 12 | .95 | 1.05* | 4–7 | 58 | .022 | .024* | Grooved |
| 1.3 | 12 | .76 | 2.2 | 3–12 | 65 | .022 | .065 | Galvanized |
| 1.9 | 24 | 1.3 | 3.3 | 11–27 | 124 | .020 | .052 | Plain Pipe |
| 1.9 | 18 | 1.5 | 6.5 | 7–15 | 108 | .023 | .102 | Plain Pipe |
| 1.9 | 10.5 | 3.0 | 6.0 | 4–8 | 53 | .047 | .094 | Plain Pipe |

| | | Predicted Forces | | Predicted Elongations | | Pipe Properties | | |
|---|---|---|---|---|---|---|---|---|
| D (in) | R (in) | Fy (kp) | Fu (kp) | ey (in) | eu (in) | Ty (kp) | Tu (kp) | M (kp-in) |
| 1.3 | 12 | 1.06 | 3.1 | 6 | 60 | 31 | 43 | 15 |
| 1.3 | 12 | .85 | 2.5 | 6 | 60 | 26 | 34 | 12 |
| 1.9 | 24 | 1.20 | 3.5 | 12 | 120 | 51 | 64 | 34 |
| 1.9 | 18 | 1.60 | 4.7 | 9 | 90 | 51 | 64 | 34 |
| 1.9 | 10.5 | 2.75 | 8.1 | 5.3 | 52 | 51 | 64 | 34 |

EMPIRICAL FORMULATION FOR PLAIN PIPE LOOP $Fy = .85M/R$ = yield strength of pipe loop
$Fu = 2.5M/R$ = ultimate strength of pipe loop
$ey = 0.5R$ = elongation of pipe loop at yield
$eu = 5.0R$ = ultimate elongation of pipe loop
$Ty = 3YDt$ = tensile yield strength of plain pipe
$Tu = 4YDt$ = tensile ultimate strength of plain pipe
$M = YD^2t$ = ultimate bending moment of plain pipe
$D$ = pipe diameter
$Y$ = pipe yield stress
$t$ = wall thickness
$R$ = radius of loop
*Premature initial fracture of grooved pipe loop 3. A method for protecting an offshore structure from a certain tension load in a pipeline connecting to said structure, comprising:

constructing a pipe loop in said pipeline of relative weakness in tension so as to fail prior to reaching said certain tension load; and temporarily connecting together adjacent ends of the pipe loop during construction to resist installation loads and, after construction of the pipeloop, removing the connection, thereby activating the pipeloop as a deliberate weak link in the pipeline.

4. The method of claim 3 including forming the temporary connection with a clamp.

5. The method of claim 3 including forming the temporary connection with a chain.

6. A method for protecting an offshore structure from a certain tension load in a pipeline connecting to said structure, comprising:

constructing a pipe loop in said pipeline, said pipe loop being designed to have relative weakness in tension so as to fail prior to reaching said certain tension load, and forming the pipe loop into less than a 360-degree loop.

7. A method for protecting an offshore structure from a certain tension load in a pipeline connecting to said structure, comprising:

constructing a pipe loop in said pipeline, said pipe loop being designed to have relative weakness in tension so as to fail prior to reaching said certain tension load, and forming the pipe loop into a V-shape.

8. A method for protecting an offshore structure from a certain tension load in a pipeline connecting to said structure, comprising:

constructing a pipe loop in said pipeline, said pipe loop being designed to have relative weakness in tension so as to fail prior to reaching said certain tension load, and forming three adjacent circular pipe segments to form the pipe loop into a $\Omega$-shape.

* * * * *